(12) United States Patent
Sengodan

(10) Patent No.: US 7,661,108 B2
(45) Date of Patent: Feb. 9, 2010

(54) MESSAGING COMPONENT CONFIGURATION AND DEPLOYMENT IN AN ARCHIVED FORM

(75) Inventor: Kathiravan Sengodan, Edison, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 849 days.

(21) Appl. No.: 11/203,075

(22) Filed: Aug. 12, 2005

(65) Prior Publication Data

US 2007/0044107 A1 Feb. 22, 2007

(51) Int. Cl.
- G06F 9/44 (2006.01)
- G06F 9/445 (2006.01)
- G06F 13/00 (2006.01)
- G06F 15/177 (2006.01)

(52) U.S. Cl. .................. 719/315; 709/220; 717/176
(58) Field of Classification Search ......... 719/313–316, 719/318; 709/201–203, 220–226; 717/176–178
See application file for complete search history.

(56) References Cited

U.S. PATENT DOCUMENTS

| | | | |
|---|---|---|---|
| 7,069,553 B2 * | 6/2006 | Narayanaswamy et al. | 717/173 |
| 7,188,163 B2 * | 3/2007 | Srinivasan et al. | 709/221 |
| 2003/0033369 A1 * | 2/2003 | Bernhard | 709/203 |
| 2007/0061277 A1 * | 3/2007 | Boden et al. | 707/1 |

* cited by examiner

Primary Examiner—Hyung S Sough
Assistant Examiner—Qing-Yuan Wu
(74) Attorney, Agent, or Firm—Fliesler Meyer LLP

(57) ABSTRACT

Embodiments provide mechanisms and methods for configuring a messaging component of an application. These mechanisms and methods can enable embodiments to configure message objects, i.e., software objects relating to messaging, with the messages. The ability of embodiments to configure message objects with messages can enable application developers, for example, to package custom code, for example, as message objects combined with messages and/or parameters into an archive convenient for distributing to one or more servers, clients or other computational entities. The distributed archive can be readily accessed by these computational entities, enabling embodiments to achieve improved configuration of the messaging component of a distributed system.

13 Claims, 4 Drawing Sheets

US 7,661,108 B2

MESSAGING COMPONENT CONFIGURATION AND DEPLOYMENT IN AN ARCHIVED FORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to configuration and deployment of application server systems, and more particularly to a mechanism for providing a messaging component configuration and deployment.

BACKGROUND

With the explosive growth of the World Wide Web in recent years, service providers have turned to application servers as a platform of choice for providing services to users. Service providers may install applications on one or more servers over an application server product. The application server product provides centralized management and supporting services to the applications. Many of such services include a messaging component that may include messages for display to a user, for example.

One problem that arises with messaging in application server controlled environments is that the message routines need to be coordinated between a variety of disparate machines in a distributed system. Differences in release levels among machines in the distributed environment can result in chaos if the messaging components are not properly deployed to account for these differences. One approach to addressing this problem is to employ a subsystem having a configuration that includes a set of parameters that indicate to servers and clients where and how to store and retrieve messages.

However, such conventional configuration mechanisms cannot address the needs of individual applications for customization, reducing flexibility and achievable functionality of applications built upon such conventional approaches.

BRIEF SUMMARY OF THE INVENTION

Figure 1:
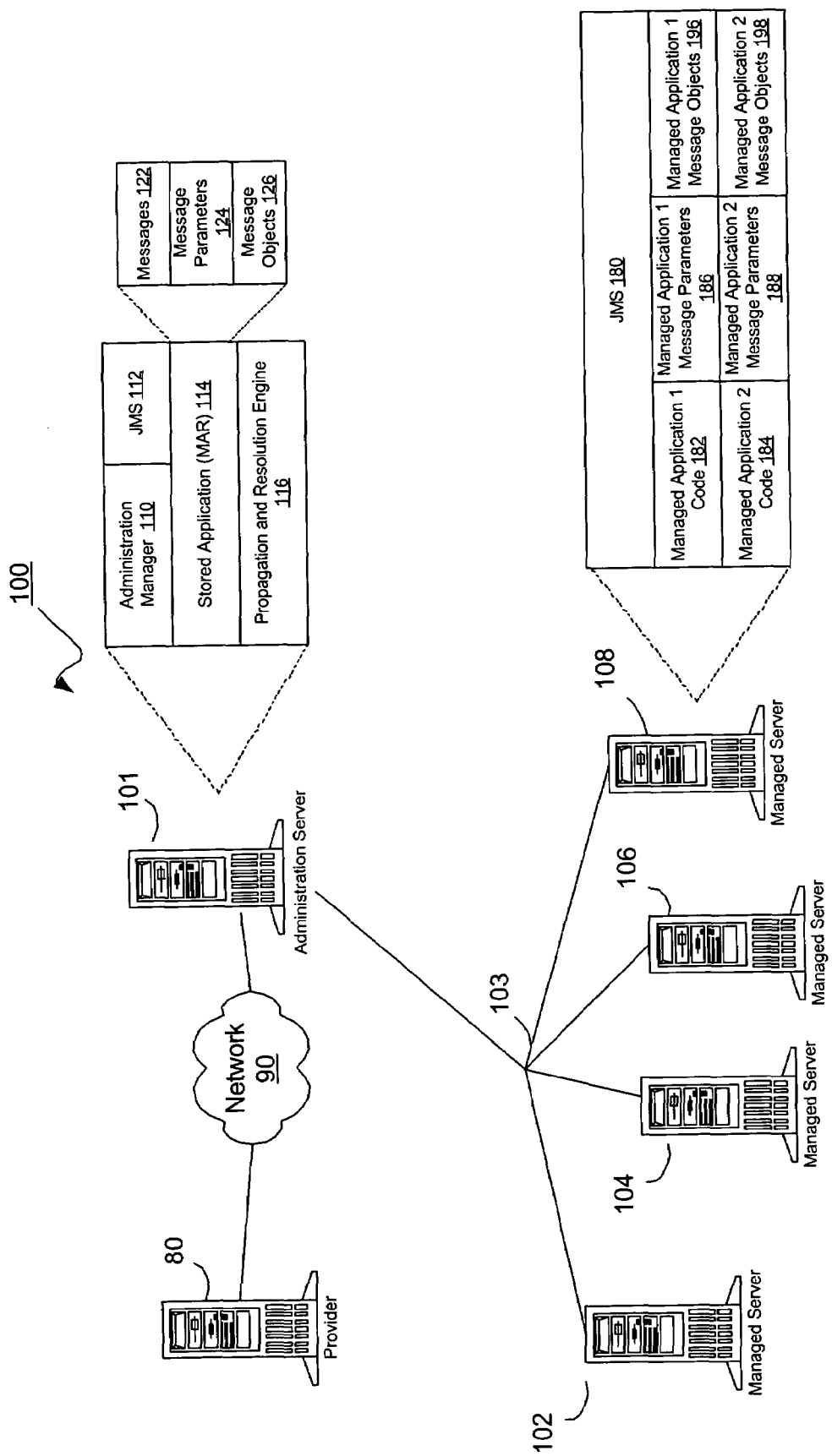
FIG. 1 is functional block diagram of an example computing environment in which techniques for configuring a messaging component in an embodiment may be implemented.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for configuring a messaging component of an application. These mechanisms and methods can enable embodiments to configure message objects, i.e., software objects relating to messaging, along with the messages. The ability of embodiments to configure message objects with messages can enable application developers, for example, to package custom code, for example, as message objects combined with messages and/or parameters into an archive convenient for distributing to one or more servers, clients or other computational entities. Further, the ability to configure message objects can enable application developers to include instructions for setting parameters relating to messaging when the application is installed. The distributed archive can be readily accessed by these computational entities, enabling embodiments to achieve improved configuration of the messaging component of a distributed system.

In an embodiment, a method for configuring a messaging component for an application is provided. The method embodiment includes capturing message information for the application. The message information includes at least one message, at least one message parameter necessary to configure the application for a first computing environment, and at least one message object implementing at least one messaging service of interest. As used herein, the term message parameter is defined as any mechanism that enables messaging system behavior to be configured. By way of non-limiting examples, message parameters may be used to configure a message system to act according to any of: point-to-point, publish-subscribe, or peer-to-peer models of operation. As used herein, the term messaging object is defined as a software object that implements any feature or function related to messaging. By way of non-limiting examples, message objects can be used to implement any of: messaging interceptors that can intercept, inspect, update and route the messages that are flowing through a system, store and forward agents that can transparently store and forward the messages, and other types of messaging agents for performing message related activities in a disconnected distributed computing environment. A message configuration is created for the application. The message configuration including instructions for deploying the message(s), the message parameter(s) necessary to configure the application for a computing environment, and the message object(s) implementing messaging service(s) of interest. The message configuration and the message object(s) are distributed in an archive format for deployment with the application in a second computing environment.

In another embodiment, a method for deploying an application including a messaging component on a target server is provided. The method embodiment includes receiving a message configuration for the application in an archive format. The message configuration including instructions for deploying at least one message, at least one message parameter necessary to configure the application for a computing environment, and at least one message object implementing at least one messaging service of interest. In one embodiment, the message(s) can be provided to a Java™ Messaging System message subsystem. (Java™ is a trademark of Sun Microsystems, Inc.) The message parameter(s) are configured according to instructions for configuring the application for a computing environment stored with the message configuration. The message object(s) implementing the messaging service(s) of interest may be stored according to the instructions. The foregoing message embodiment can enable the messaging component to be deployed along with the application on the target server(s).

As used herein, the term application is intended to be broadly construed to include any application, program or process resident on one or more computing devices capable of providing services to a requester or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services.

While the present invention is described with reference to an embodiment in which a message archive file is created in order to contain messaging configurations and objects for applications and processes in a managed server environment, the present invention is not limited to the use of a message archive file and may be practiced using other mechanisms for containing the messaging configurations and objects without departing from the scope of the embodiments claimed.

DETAILED DESCRIPTION

FIG. 1 is functional block diagram of an example computing environment in which techniques for configuring a messaging component in an embodiment may be implemented. As shown in FIG. 1, an enterprise application environment 100 includes a management framework in which one or more applications 182, 184 executing on one or more managed servers 102-108 may be managed using a central point administration server 101. In an embodiment, management framework 100 may conform to Java 2 Extended Edition (J2EE) specification. A communications connection 103 connects administration server 101 with the managed servers 102-108. Connection 103 may include a network, shared memory interface or other types of communication interconnects.

An application provider 80 may prepare and provide applications for deployment on one or more of the managed servers 102-108. Application provider 80 may be connected with administration server 101 via a network 90, for example, or in an alternative configuration, application provider 80 may be a completely separate entity distinct from framework 100. In the latter configuration, applications may be packaged as stored program code on a permanent or semi-permanent computer readable storage medium.

In an embodiment, administration server 101 includes a Java Messaging System (JMS) component 112, which is a J2EE compliant subsystem for providing messaging. A stored application 114 may include messaging information that is packaged as a message archive (MAR) file by provider 80. The message archive file of stored application 114 may include message information, such as one or more messages 122, and one or more parameters 124 that indicate to servers and/or clients, where and how to store and retrieve messages. The message archive file may also include one or more message object(s) 126 implementing at least one messaging service of Interest for deployment into one or more target server (s), such as managed servers 102-108. The message object(s) may include: program code, custom code, parameters, custom filter programs, router programs that may be written for, loaded into or deployed with a server environment, configuration parameters, and at least one computational entity relating to filtering, and/or routing of messages.

A propagation and resolution engine 116, under the direction of an administration manager process 110, provides for deployment of the stored application 114 onto one or more of the managed servers 102-108.

During deployment, administration server 101 may deploy the stored application 114 onto one or more of the managed servers, such as managed server 108. As shown by FIG. 1, managed server 108 also includes a copy of the JMS messaging subsystem 180. The stored application 114 may be deployed on server 108 in accordance with a message configuration prepared by provider 80. In an embodiment, the message configuration includes instructions for loading the message object(s) along with any required message parameters that control the operation of the message object(s). In a typical scenario, deployment of the stored application 114 includes deploying the application code, such as managed application 1 code 182. In addition, the message information stored in the MAR file comprising stored application 114 is also deployed, forming managed application 1 message parameters. Message objects accompanying the message information may be deployed along with the managed application 1 code 182, forming managed application 1 message objects 196. The messages will also be loaded and stored according to the instructions of the messaging configuration prepared by the provider 80.

Deployment of message parameters 186 and message objects 196 together with application code 182 can enable embodiments to configure message objects along with the messages at installation time. This ability to configure message objects with messages can enable packaging of custom code, for example, as message objects combined with messages and/or parameters into an archive convenient for distributing to one or more servers 102-108. The distributed archive can be readily accessed by these computational entities, enabling embodiments to achieve improved configuration of the messaging component of a distributed system.

While the invention is described with reference to an embodiment in which multiple machines support administration server 101 and managed servers 102-108, other embodiments may include installations that comprise of a single WebLogic® server instance or multiple instances, each hosted on one or more physical machines. In yet further embodiments, administration server 101 may exist as a separate process executing on the same physical machine as one or more of the managed servers 102-108.

Figure 2A:
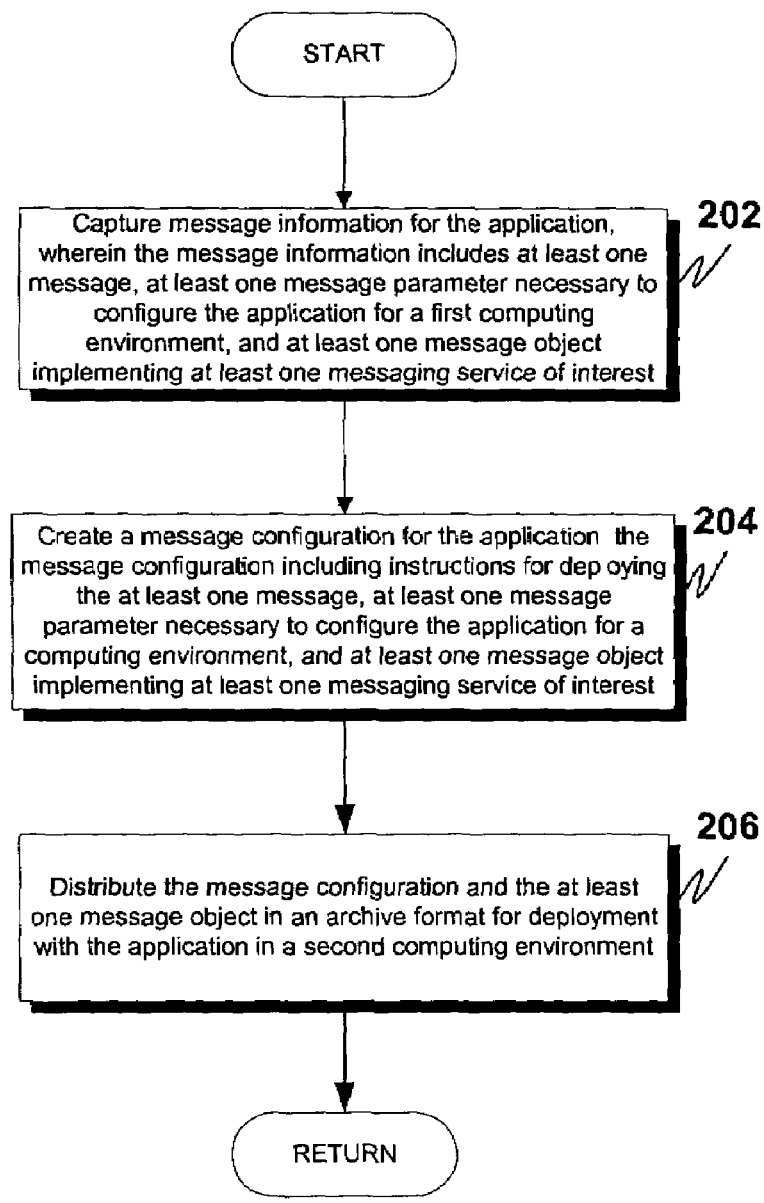
FIG. 2A is an operational flow diagram illustrating a high level overview of a technique for configuring a messaging component for an application in an embodiment.

FIG. 2A is an operational flow diagram illustrating a high level overview of a technique for configuring a messaging component for an application in an embodiment. The technique for configuring a messaging component shown in FIG. 2A is operable with applications using a messaging component of J2EE, that are being prepared by a provider, such provider 80 of FIG. 1, for example. As shown in FIG. 2A, message information for the application is captured (block 202). The message information includes at least one message, at least one message parameter necessary to configure the application for a first computing environment, and at least one message object implementing at least one messaging service of interest. A message configuration is created for the application (block 204). The message configuration includes instructions for deploying the at least one message, at least one message parameter necessary to configure the application for a computing environment, and at least one message object implementing at least one messaging service of interest. The message configuration and the at least one message object are distributed in an archive format for deployment with the application in a second computing environment (block 206).

In an embodiment, capturing message information for the application includes determining a set of Java Messaging Service (JMS) parameters that indicate where and how to store and retrieve messages. In an embodiment, determining a set of Java Messaging Service (JMS) parameters that indicate where and how to store and retrieve messages includes determining at least one of: program code, custom code, parameters, custom filter programs, router programs that may be written for, loaded into, or deployed with a server environment, configuration parameters, and a computational entity relating to filtering or routing of messages.

In an embodiment, creating a message configuration for the application includes creating a hierarchically arranged archive format file that includes the instructions for deploying the at least one message, the at least one message parameter necessary to configure the application for a computing environment, and the at least one message object implementing at least one messaging service of interest. In an embodiment, creating a hierarchically arranged archive format file that includes the instructions for deploying the at least one message, the at least one message parameter necessary to configure the application for a computing environment, and the at least one message object implementing at least one messaging service of interest includes preparing the message information and at least one message object into a Java 2 Extended Edition (J2EE) archive format.

In an embodiment, distributing the message configuration and the at least one message object in an archive format for deployment with the application in a second computing environment includes distributing the archive for deployment on at least one target server, the target server having the second computing environment, wherein the second computing environment differs from the first computing environment. In an embodiment, the message archive can be deployed on the at least one target server. Deploying the message archive on the at least one target server includes configuring one or more of the at least one message, at least one parameter and at least one message object to operate in the second computing environment of the at least one target server.

Figure 2B:
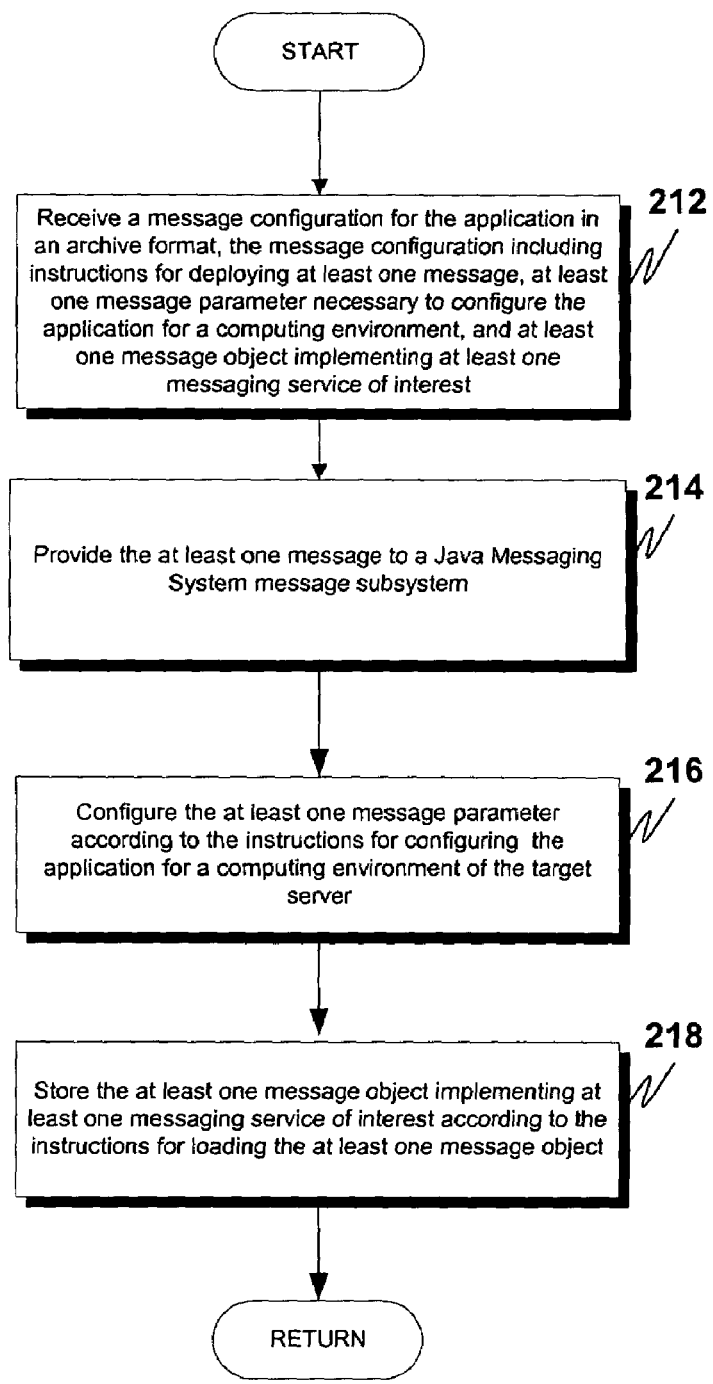
FIG. 2B is an operational flow diagram illustrating a high level overview of a technique for deploying a messaging component for an application in an embodiment.

FIG. 2B is an operational flow diagram illustrating a high level overview of a technique for deploying a messaging component for an application on a target server in an embodiment. The technique for deploying a messaging component shown in FIG. 2B is able to deploy applications using a messaging component of J2EE, such as managed application 182 installed on managed server 108 of FIG. 1, for example.

As shown in FIG. 2B, a message configuration for the application in an archive format is received (block 212). The message configuration includes instructions for deploying at least one message, at least one message parameter necessary to configure the application for a computing environment, and at least one message object implementing at least one messaging service of interest. The at least one message is provided to a Java Messaging System message subsystem (block 214). The at least one message parameter is configured according to instructions for configuring the application for a computing environment stored with the message configuration (block 216). The at least one message object implementing at least one messaging service of interest is stored according to the instructions (block 218). The foregoing message embodiment can enable the messaging component to be deployed along with the application on the at least one target server.

The following depicts an example archive format suitable for storing messaging configuration in an example embodiment:

```
D:.
|  appscope.ear
|
|
|
+---jmsproducerapp
|   |   jmsproducerapp.mar
|   |
|   |
|   |
|   +---jmsproducerapp
|
|   +---META-INF
|
|       jms-mar.xml
|
|       MANIFEST.MF
|
|       weblogic-jms-mar.xml
|
|
+---META-INF
|       application.xml
|
|       MANIFEST.MF
|
|       weblogic-application.xml
|
|
+---qreceiver
|   |   appscopeejbr.jar
|   |
|   |   _WL__GENERATED
|   |
|   |
|   +---common
|
|   |   CommonObjectMessage.class
|   |
|   |
|   +---META-INF
|   |
|   |   ejb-jar.xml
|   |
|   |   MANIFEST.MF
|   |
|   |   weblogic-ejb-jar.xml
|   |
|   |
|   |
|   +----qreceiver
```

-continued

```
|    QueueReceiver.class
|
|    QueueReceiverBean.class
|
|    QueueReceiverBean__r02vwg__EOImpl.class
|
|    QueueReceiverBean__r02vwg__EOImplRTD.xml
|
|    QueueReceiverBean__r02vwg__HomeImpl.class
|
|    QueueReceiverBean__r02vwg__HomeImplRTD.xml
|
|    QueueReceiverBean__r02vwg__Impl.class
|
|    QueueReceiverBean__r02vwg__Intf.class
|
|    QueueReceiverHome.class
|
|
+---sender
|    appscopeejbs.jar
|
|    __WL__GENERATED
|
|
|
+---common
|    CommonObjectMessage.class
|
|
|
+---META-INF
|    ejb-jar.xml
|
|    MANIFEST.MF
|
|    weblogic-ejb-jar.xml
|
|
+---sender
     Sender.class
     SenderBean.class
     SenderBean__a6gumi__EOImpl.class
     SenderBean__a6gumi__EOImplRTD.xml
     SenderBean__a6gumi__HomeImpl.class
     SenderBean__a6gumi__HomeImplRTD.xml
     SenderBean__a6gumi__Impl.class
     SenderBean__a6gumi__Intf.class
     SenderHome.class
```

The following depicts an example of an application configuration file format accompanying the installation of an archive file in an example embodiment:

```
<Application Name="appscope"
    Path="D:\weblogic\src__diablo__141__02sj\tools\deployment\jms\appscope\appscope.ear" TwoPhase="true">
    <EJBComponent Name="sender/appscopeejbs.jar" Targets="myserver" URI="sender/appscopeejbs.jar"/>
    <EJBComponent Name="qreceiver/appscopeejbr.jar"
        Targets="myserver" URI="qreceiver/appscopeejbr.jar"/>
    <JMSComponent Name="jmsproducerapp/jmsproducerapp.mar"
        Targets="myserver" URI="jmsproducerapp/jmsproducerapp.mar"/>
</Application>
```

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for configuring a messaging component as discussed herein.

Figure 3:
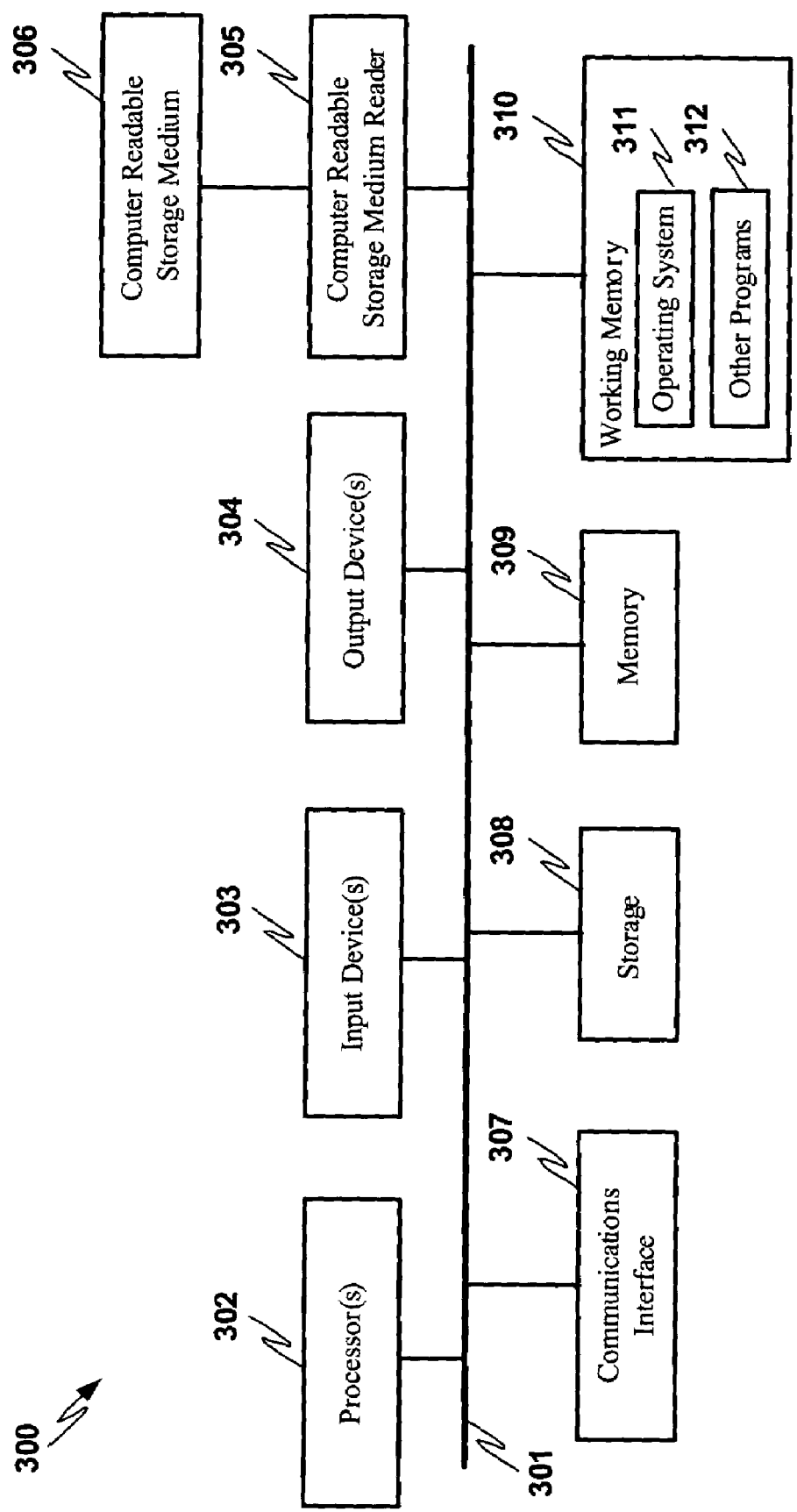
FIG. 3 is a hardware block diagram of an example computer system, which may be used to embody one or more components in an embodiment.

FIG. 3 illustrates an exemplary processing system 300, which can comprise one or more of the elements of FIG. 1. Turning now to FIG. 3, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for configuring a messaging component of an application, the method comprising:
   receiving, by an administration server, an application adapted to be deployed on a target server and message information for the application, wherein the message information includes a set of messages, at least one message parameter employed to configure the application for the target server, and at least one message object that performs filtering or routing of messages;
   packaging the application, the set of messages, the message object and the message parameter in a message archive file, such that custom messaging functionality of the application adapted for the target server is included in the message archive file; and
   distributing the message archive file to the target server;
   receiving the message archive file by the target server and loading the application onto the target server from the message archive file, wherein the message object combined with the set of messages is loaded from the message archive file into the target server at application installation time and wherein the message parameter from the archive file is used to configure the application on the target server with the custom messaging functionality.

2. The method of claim 1, wherein the message information is captured by:
   determining a set of Java Messaging Service (JMS) parameters that indicate where and how to store and retrieve messages.

3. The method of claim 2, wherein determining a set of Java Messaging Service (JMS) parameters that indicate where and how to store and retrieve messages includes:
   determining at least one of: program code, custom code, parameters, custom filter programs, router programs that may be written for, loaded into, or deployed with a server environment, configuration parameters, and a computational entity relating to filtering or routing of messages.

4. The method of claim 1, wherein packaging the application, the messages, the message object and the message parameter in a message archive file includes:
   creating a hierarchically arranged archive format file that includes instructions for deploying the set of messages, the at least one message parameter necessary to configure the application for the target server, and the at least one message object that performs filtering or routing of messages.

5. The method of claim 4, wherein creating a hierarchically arranged archive format file further includes:
   preparing the message information into a Java 2 Extended Edition (J2EE) archive format.

6. The method of claim 1, wherein loading the application onto the target server from the message archive file includes:
   configuring one or more of the following: at least one message, at least one parameter and at least one message object to operate in the target server.

7. A computer-readable storage medium carrying one or more sequences of instructions for configuring a messaging component, which instructions, when executed by one or more processors, cause the one or more processors to carry out the steps of:
   receiving, by an administration server, an application adapted to be deployed on a target server and message information for the application, wherein the message information includes a set of messages, at least one message parameter employed to configure the application for the target server, and at least one message object that performs filtering or routing of messages;

packaging the application, the set of messages, the message object and the message parameter in a message archive file, such that custom messaging functionality of the application adapted for the target server is included in the message archive file; and distributing the message archive file to the target server;

receiving the message archive file by the target server and loading the application onto the target server from the message archive file, wherein the message object combined with the set of messages is loaded from the message archive file into the target server at application installation time and wherein the message parameter from the archive file is used to configure the application on the target server with the custom messaging functionality.

8. The computer-readable storage medium of claim 7, wherein the message information is captured by:

determining a set of Java Messaging Service (JMS) parameters that indicate where and how to store and retrieve messages.

9. The computer-readable storage medium of claim 8, wherein the instructions for carrying out the step of determining a set of Java Messaging Service (JMS) parameters that indicate where and how to store and retrieve messages include instructions for carrying out the step of:

determining at least one of: program code, custom code, parameters, custom filter programs, router programs that may be written for, loaded into, or deployed with a server environment, configuration parameters, and a computational entity relating to filtering or routing of messages.

10. The computer-readable storage medium of claim 7, wherein the instructions for carrying out the steps of packaging the application, the messages, the message object and the message parameter in a message archive file include instructions for carrying out the step of:

creating a hierarchically arranged archive format file that includes instructions for deploying the set of messages, the at least one message parameter necessary to configure the application for the target server, and the at least one message object that performs filtering or routing of messages.

11. The computer-readable storage medium of claim 10, wherein the instructions for carrying out the step of creating a hierarchically arranged archive format file further include instructions for carrying out the step of:

preparing the message information into a Java 2 Extended Edition (J2EE) archive format.

12. The computer-readable storage medium of claim 7, wherein the instructions for carrying out the step of loading the application onto the target server from the message archive file include instructions for carrying out the step of:

configuring one or more of the following: at least one message, at least one parameter and at least one message object to operate in the target server.

13. An apparatus for configuring a messaging component, the apparatus comprising:

a processor; and one or more stored sequences of instructions which, when executed by the processor, cause the processor to carry out the steps of:

receiving, by an administration server, an application adapted to be deployed on a target server and message information for the application, wherein the message information includes a set of messages, at least one message parameter employed to configure the application for the target server, and at least one message object that performs filtering or routing of messages;

packaging the application, the set of messages, the message object and the message parameter in a message archive file, such that custom messaging functionality of the application adapted for the target server is included in the message archive file; and distributing the message archive file to the target server;

receiving the message archive file by the target server and loading the application onto the target server from the message archive file, wherein the message object combined with the set of messages is loaded from the message archive file into the target server at application installation time and wherein the message parameter from the archive file is used to configure the application on the target server with the custom messaging functionality.

* * * * *

UNITED STATES PATENT AND TRADEMARK OFFICE
CERTIFICATE OF CORRECTION

PATENT NO. : 7,661,108 B2
APPLICATION NO. : 11/203075
DATED : February 9, 2010
INVENTOR(S) : Kathiravan Sengodan It is certified that error appears in the above-identified patent and that said Letters Patent is hereby corrected as shown below:

Title Page, (*) Notice: delete "849 days" and insert -- 1117 days --.

On sheet 2 of 4, in Figure 2A, Box 204, line 2, delete "dep oying" and insert -- deploying --, therefor.

In column 3, line 30, delete "requester" and insert -- requestor --, therefor.

In column 3, line 58, after "to" insert -- the --.

In column 4, line 16, delete "Interest" and insert -- interest --, therefor.

Signed and Sealed this

Fourteenth Day of September, 2010

David J. Kappos
*Director of the United States Patent and Trademark Office*